US011433781B1

(12) United States Patent
Polosajian

(10) Patent No.: US 11,433,781 B1
(45) Date of Patent: Sep. 6, 2022

(54) SAFETY SYSTEM AND METHOD FOR PROTECTING UNATTENDED PASSENGERS IN A VEHICLE

(71) Applicant: Leo Polosajian, Reseda, CA (US)

(72) Inventor: Leo Polosajian, Reseda, CA (US)

(*) Notice: Subject to any disclaimer, the term of this patent is extended or adjusted under 35 U.S.C. 154(b) by 0 days.

(21) Appl. No.: 17/459,992

(22) Filed: Aug. 27, 2021

(51) Int. Cl.
| | |
|---|---|
| *G08B 21/00* | (2006.01) |
| *B60N 2/00* | (2006.01) |
| *B60H 1/00* | (2006.01) |
| *G08B 21/24* | (2006.01) |

(52) U.S. Cl.
CPC ......... *B60N 2/002* (2013.01); *B60H 1/00742* (2013.01); *G08B 21/24* (2013.01)

(58) Field of Classification Search
CPC ...... B60N 2/002; B60N 2/28; B60H 1/00742; G08B 21/24; G08B 21/22; G08B 21/0269; B60R 21/01556
USPC ........................................................ 340/438
See application file for complete search history.

(56) References Cited

U.S. PATENT DOCUMENTS

| | | | |
|---|---|---|---|
| 6,812,844 B1 | 11/2004 | Burgess | |
| 6,930,614 B2 | 8/2005 | Rackham et al. | |
| 8,217,796 B2 | 7/2012 | Trummer | |
| 8,232,874 B1 | 7/2012 | Aneiros et al. | |
| 9,545,856 B2 | 1/2017 | Borgne et al. | |
| 10,068,452 B1* | 9/2018 | Nunez ................. | B60N 2/2881 |
| 11,001,227 B2 | 5/2021 | Davis | |
| 2005/0057350 A1 | 3/2005 | Younse | |
| 2015/0137962 A1* | 5/2015 | Binnicker .............. | B60N 2/002 |
| | | | 340/457 |
| 2016/0049061 A1* | 2/2016 | Scarborough .......... | G08B 21/24 |
| | | | 340/449 |
| 2016/0193960 A1* | 7/2016 | Barabas .................. | B60Q 9/00 |
| | | | 340/457 |
| 2016/0339838 A1 | 11/2016 | Diaz | |
| 2018/0068544 A1* | 3/2018 | Caperell ............... | H04W 4/027 |
| 2018/0322758 A1* | 11/2018 | Rubinstein ............ | G08B 21/24 |
| 2018/0354443 A1* | 12/2018 | Ebrahimi ............. | B60N 2/2812 |
| 2020/0090515 A1* | 3/2020 | Torres .................... | G08B 21/18 |
| 2020/0094709 A1* | 3/2020 | Dutkin .................. | B60N 2/002 |
| 2021/0261089 A1 | 8/2021 | Davis | |

FOREIGN PATENT DOCUMENTS

CA          2614906 C    12/2006

* cited by examiner

*Primary Examiner* — Mark S Rushing
(74) *Attorney, Agent, or Firm* — Lewis Roca Rothgerber Christie LLP

(57) ABSTRACT

A pressure-sensitive seat including at least one pressure sensor configured to measure a pressure on the pressure-sensitive seat, a processor, a memory device, a network adapter, and a system bus configured to enable communication between the at least one pressure sensor, the processor, the memory device, and the network adapter. The memory device includes instructions which, when executed by the processor, cause the processor to compare the pressure to a threshold pressure, determine a proximity of a mobile electronic device to the pressure-sensitive seat, and transmit, by the network adapter, a command comprising executable instructions to a device in response to the pressure on the pressure-sensitive seat exceeding the threshold pressure and the proximity exceeding a threshold proximity.

22 Claims, 3 Drawing Sheets

SAFETY SYSTEM AND METHOD FOR PROTECTING UNATTENDED PASSENGERS IN A VEHICLE

BACKGROUND

1. Field

The present disclosure relates to various embodiments of a system and method for protecting unattended passengers in a vehicle.

2. Description of Related Art

Children and pets are commonly left unattended in vehicles, such as passenger trucks, cars, and vans. In some instances, the driver of the vehicle may inadvertently forget the child or the pet in the vehicle. In other instances, the child or pet may be purposefully left unattended in the vehicle while the driver of the vehicle completes an errand, such as performing a financial transaction at a bank or purchasing groceries at a grocery store. However, during summer months or during unseasonably hot weather, the temperature inside the cabin of a vehicle that is turned off or in which the air conditioning is off can rise precipitously and can exceed the outside air temperature after only several minutes. According to some studies, the temperature inside the car cabin may become 19 degrees hotter than the outdoor temperature after only 10 minutes, and the temperature inside the car may reach 43 degrees hotter than the outdoor temperature after about an hour. The temperature inside the vehicle cabin typically peaks at about 45 to 50 degrees Fahrenheit hotter than the temperature outside the vehicle. Accordingly, the conditions inside the vehicle may become deadly or at least present a severe health risk to the unattended passengers after only a few minutes.

SUMMARY

The present disclosure relates to various embodiments of a pressure-sensitive seat configured to be installed in a vehicle. In one embodiment, the pressure-sensitive seat includes at least one pressure sensor configured to measure a pressure on the pressure-sensitive seat, a processor, a memory device, a network adapter, and a system bus configured to enable communication between the at least one pressure sensor, the processor, the memory device, and the network adapter. The memory device includes instructions which, when executed by the processor, cause the processor to compare the pressure to a threshold pressure determine a proximity of a mobile electronic device to the pressure-sensitive seat, and transmit, by the network adapter, a command including executable instructions to the mobile electronic device or the vehicle in response to the pressure on the pressure-sensitive seat exceeding the threshold pressure and the proximity exceeding a threshold proximity.

The threshold pressure may be in a range from approximately 1 pound (approximately 0.5 kilograms) to approximately 5 pounds (approximately 2.3 kilograms).

The threshold proximity may be in a range from approximately 5 feet to approximately 50 feet.

The instructions, when executed by the processor, may cause the processor to transmit the command in response to the pressure exceeding the threshold pressure and the proximity exceeding the threshold proximity for a threshold duration.

The threshold duration may be in a range from approximately 10 seconds to approximately 30 seconds.

The instructions, when executed by the processor, may further cause the processor to acquire a status of the vehicle in which the pressure-sensitive seat is located, and transmit the command in response to the pressure exceeding the threshold pressure, the proximity exceeding the threshold proximity, and the status indicating the vehicle is turned off.

The pressure-sensitive seat is a child car seat or a protective seat mat for an animal.

The at least one pressure sensor may be a capacitive pressure sensor, a piezoelectric pressure sensor, a strain gauge pressure sensor, and/or a variable reluctance pressure sensor.

The instructions, when executed by the processor, may cause the processor to transmit the command to the mobile electronic device, and the executable instructions, when executed by a processor of the mobile electronic device, may cause the mobile electronic device to display, on a display of the mobile electronic device, a visual alert.

The instructions, when executed by the processor, may cause the processor to transmit the command to the mobile electronic device, and the executable instructions, when executed by a processor of the mobile electronic device, may cause the mobile electronic device to emit, from a speaker of the mobile electronic device, an audible alert.

The instructions, when executed by the processor, may cause the processor to transmit the command to the mobile electronic device, and the executable instructions, when executed by a processor of the mobile electronic device, may cause the mobile electronic device to vibrate.

The instructions, when executed by the processor, may cause the processor to transmit the command to the vehicle, and the executable instructions, when executed by a processor of the vehicle, may cause the vehicle to sound a horn of the vehicle.

The instructions, when executed by the processor, may cause the processor to transmit the command to the vehicle, and the executable instructions, when executed by a processor of the vehicle, may cause the vehicle to flash at least one light of the vehicle.

The instructions, when executed by the processor, may cause the processor to transmit the command to the vehicle, and the executable instructions, when executed by a processor of the vehicle, may cause the vehicle to at least partially open at least one window of the vehicle.

The instructions, when executed by the processor, may cause the processor to transmit the command to the vehicle, and the executable instructions, when executed by a processor of the vehicle, may cause the vehicle to unlock at least one door of the vehicle.

The present disclosure also relates to various embodiments of a method of monitoring for an unattended passenger in a vehicle. In one embodiment, the method includes determining, with a pressure sensor of a pressure-sensitive seat in a vehicle, a detected pressure on pressure-sensitive seat, comparing, with a processor, the detected pressure with a threshold pressure, acquiring at least one of a status of the vehicle and a proximity of a mobile electronic device to the vehicle or the pressure-sensitive seat, and transmitting a command including executable instructions, from a network adapter of the pressure-sensitive seat, to at least one of the vehicle and the mobile electronic device in response to the detected pressure exceeding the threshold pressure and at least one of the proximity exceeding a threshold proximity and the status of the vehicle being a predetermined status.

The method may also include at least partially opening at least one window of the vehicle in response to the command.

The method may also include unlocking at least one door of the vehicle in response to the command.

The method may further include honking a horn of the vehicle and/or flashing at least one light of the vehicle in response to the command.

The method may also include displaying a visual alert on a display of the mobile electronic device, sounding an audible alert from a speaker of the mobile electronic device, and/or vibrating the mobile electronic device in response to the command.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable system or method of protecting unattended passengers in a vehicle.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

Aspects of the present disclosure relate to various systems and methods configured to protect passengers, such as children or pets, left unattended in a vehicle. The systems and methods of the present disclosure are configured to send a command to a mobile electronic device (e.g., a smartphone) and/or to a vehicle in response to a threshold pressure (or weight) being detected on a pressure-sensitive seat in the vehicle and the mobile electronic device being a threshold distance away from the vehicle and/or the pressure-sensitive seat. The command may create an auditory, visual, and/or tactile alert in the mobile electronic device, and/or the command may cause the vehicle to emit an auditory or visual alert. Additionally, in one or more embodiments, the command may cause the vehicle to at least partially open at least one of the windows of the vehicle and/or unlock at least one door of the vehicle. In one or more embodiments, the systems and methods of the present disclosure are configured to send an alert to the mobile electronic device and/or the vehicle in response to the threshold pressure (or weight) being detected on a pressure-sensitive seat in the vehicle and the vehicle having a preselected state, such as the ignition of the vehicle being off. In one or more embodiments, the command may be sent only after the above conditions are satisfied for a threshold duration. In this manner, the systems and methods of the present disclosure are configured to prompt and enable the driver and/or bystanders to rescue passengers who have been left unattended in the vehicle.

Figure 1:
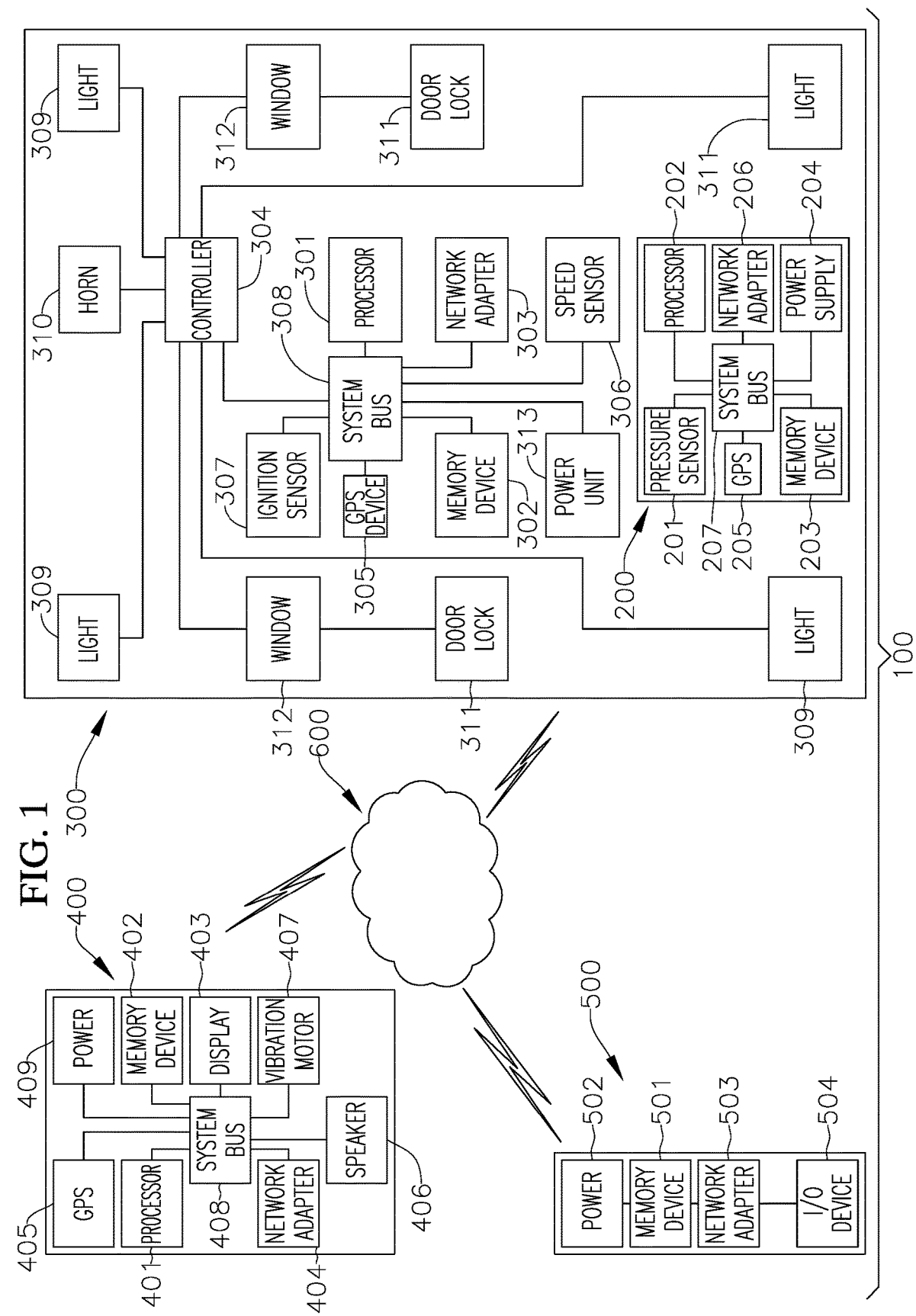
FIG. 1 is a schematic block diagram of a pressure-sensitive seat according to one embodiment of the present disclosure.

FIG. 1 is a block diagram of a system 100 according to one embodiment of the present disclosure. In the illustrated embodiment, the system 100 includes a pressure-sensitive seat 200 in a vehicle 300, a mobile electronic device 400 (e.g., a cellular phone, a tablet computer, or a wearable electronic device, such as a smart watch), and a key fob 500 for the vehicle 300. The pressure-sensitive seat 200, the vehicle 300, and the mobile electronic device 400 are connected to each other (i.e., configured to electronically communicate with each other) over a data network 600. For instance, in one or more embodiment, the pressure-sensitive seat 200, the vehicle 300, and the mobile electronic device 400 are paired or synced to each other over a wireless communication protocol, such as Bluetooth™. In the embodiment illustrated in FIG. 1, the pressure-sensitive seat 200 includes at least one pressure sensor 201 (e.g., a capacitive pressure sensor, a piezoelectric pressure sensor, a strain gauge pressure sensor, or a variable reluctance pressure sensor), a processor 202, a memory device 203, a power supply 204 (e.g., at least one secondary battery), a global positioning system (GPS) device 205, and a network adapter 206 configured to communicate with other devices, including the vehicle 300 and the mobile electronic device 400. In the illustrated embodiment, the processor 202, the memory device 203, the power supply 204, the GPS device 205, and the network adapter 206 communicate with one another over a system bus 207. In one or more embodiments, the memory device 203 may include persistent memory, such as NAND flash memory, for storing instructions.

Figure 2:
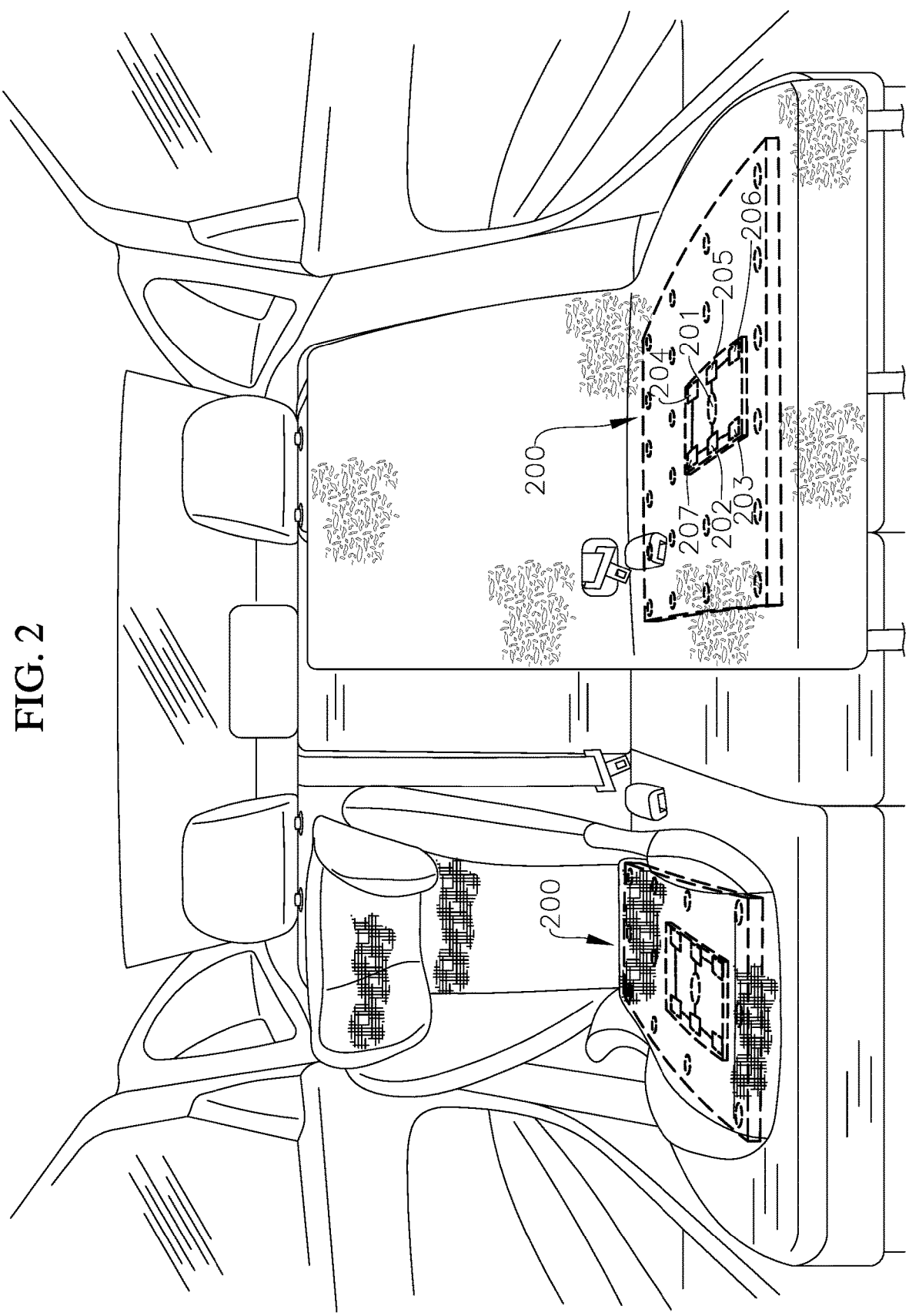
FIG. 2 is a rear-perspective view of the embodiment of the pressure-sensitive seat illustrated in FIG. 1 installed in a vehicle.
Figure 3:
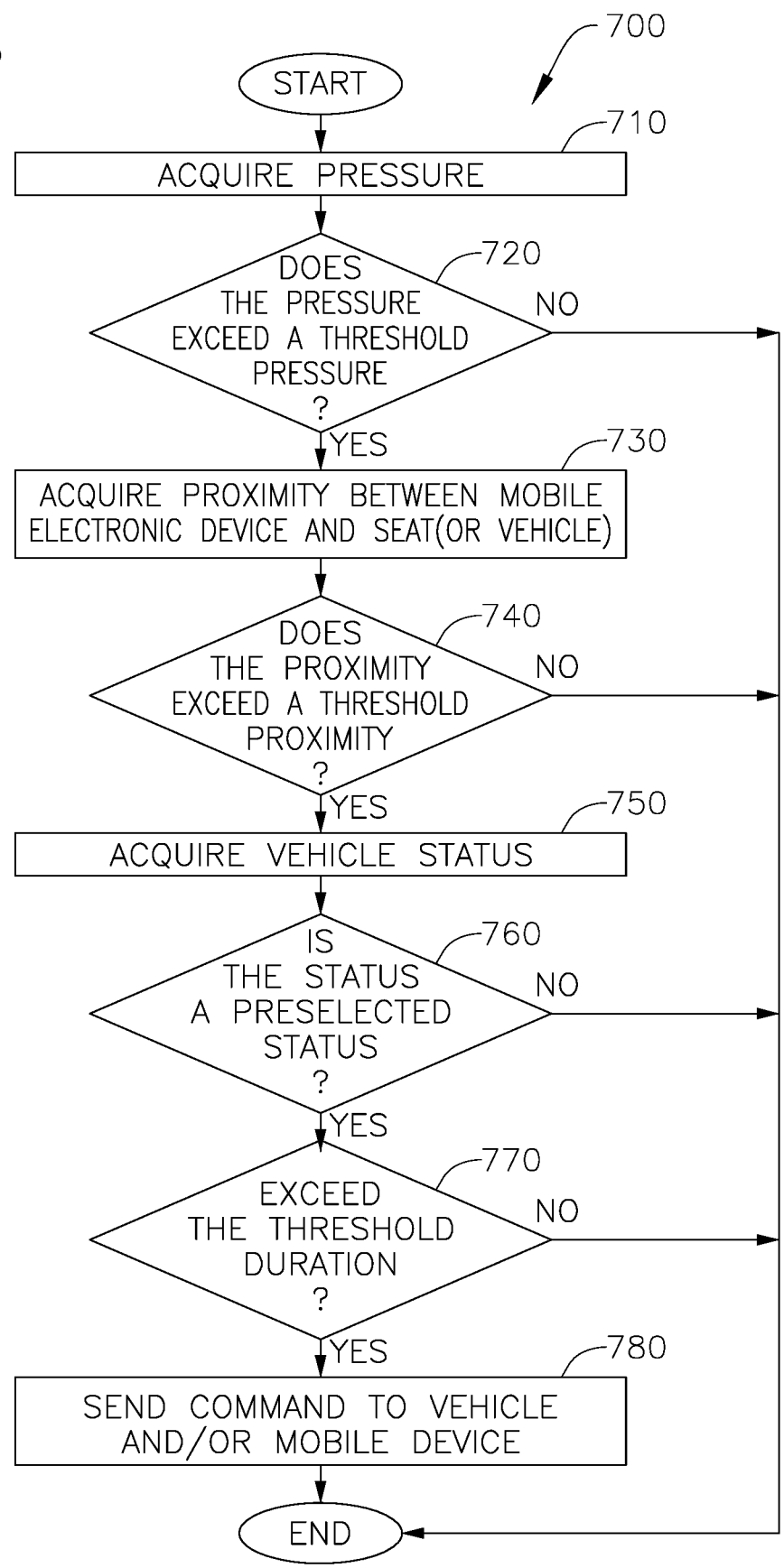
FIG. 3 is a flowchart illustrating tasks of a method of protecting unattended passengers in a vehicle.

In one or more embodiments, the pressure-sensitive seat 200 may be a child car seat or a protective mat (e.g., a mat for a pet) configured to be placed over a seat in the vehicle. In one or more embodiments, the pressure-sensitive seat 200 may be a fabric sleeve containing or housing the electronic components (e.g., the at least one pressure sensor 201, the processor 202, the memory device 203, the power supply 204, the GPS 205, the network adapter 206, and the system bus 207). In one or more embodiments, the pressure-sensitive seat 200 may be utilized to retrofit an existing child car seat (e.g., a rear-facing infant or toddler car seat, a forward-facing car seat, or a booster seat). In one or more embodiments, the pressure-sensitive seat 200 may be integrated into a child car seat. In one or more embodiments, the pressure-sensitive seat 200 may be waterproof or water-resistant (e.g., the pressure-sensitive seat 200 may include a waterproof or water-resistant cover or sleeve). FIG. 2 depicts the pressure-sensitive seat 200 in a car seat and in a protective mat for a pet installed in the rear seat of a vehicle.

As described in more detail below, the memory device 203 of the pressure-sensitive seat 200 stores instructions that, when executed by the processor 202, cause the pressure-sensitive seat 200 to transmit a command containing executable instructions to the vehicle 300 and/or the mobile electronic device 400. The executable instructions, when executed by the vehicle 300 or the mobile electronic device 400, cause vehicle 300 and/or the mobile electronic device 400 to perform various functions to alert individuals to the presence of an unattended passenger in the vehicle 300.

The term "processor" is used herein to include any combination of hardware, firmware, and software, employed to process data or digital signals. The hardware of a processor may include, for example, application specific integrated circuits (ASICs), general purpose or special purpose central processors (CPUs), digital signal processors (DSPs), graphics processors (GPUs), and programmable logic devices such as field programmable gate arrays (FPGAs). In a processor, as used herein, each function is performed either by hardware configured, i.e., hard-wired, to perform that function, or by more general purpose hardware, such as a CPU, configured to execute instructions stored in a non-transitory storage medium. A processor may be fabricated on a single printed wiring board (PWB) or distributed over several interconnected PWBs. A processor may contain other processors; for example, a processor may include two processors, an FPGA and a CPU, interconnected on a PWB.

In the illustrated embodiment, the vehicle 300 includes a processor 301, a memory device 302, a network adapter 303, a controller 304, a global positioning system (GPS) device 305 configured to determine the location of the vehicle 300, a vehicle speed sensor 306 configured to measure or determine the speed of the vehicle 300, and an ignition sensor 307 (e.g., an ignition module) configured to determine if the ignition of the vehicle 300 is on or off. In the illustrated embodiment, the processor 301, the memory device 302, the network adapter 303, the controller 304, the GPS device 305, the vehicle speed sensor 306, and the ignition sensor 307 communicate with one another over a system bus 308. The network adapter 303 of the vehicle 300 is configured to communicate with other devices, including the pressure-sensitive seat 200 and the mobile electronic device 400. As described in more detail below, the controller 304 is configured to activate or operate various systems of the vehicle 300, such as, for example, lights 309 (e.g., headlights, tail lights, and/or hazard lights), a horn 310, door lock 311, and/or windows 312, in response to the pressure-sensitive seat 200 detecting or determining that a passenger is unattended in the vehicle 300. In the illustrated embodiment, the vehicle 300 also includes a power unit 313 (e.g., a rechargeable battery configured to power the various electronic components).

In the illustrated embodiment, the mobile electronic device 400 includes a processor 401, a memory device 402, a display 403 configured to display images, a network adapter 404 configured to communicate with other devices, including the vehicle 300 and the pressure-sensitive seat 200, a GPS device 405, a speaker 406, and a vibration motor 407 (e.g., an eccentric rotating mass (ERM) vibration motor). In the illustrated embodiment, the processor 401, the memory device 402, the display 403, the network adapter 404, the GPS device 405, the speaker 406, and the vibration motor 407 communicate with one another over a system bus 408. In one or more embodiments, the memory device 402 of the mobile electronic device 400 may include persistent memory, such as NAND flash memory, for storing instructions. In the illustrated embodiment, the mobile electronic device 400 also includes a power unit 409 (e.g., a rechargeable battery configured to power the various electronic components).

In the illustrated embodiment, the fob 500 includes a memory device 501, a power unit 502, a network adapter 503, and an input-output (I/O) device 504. The I/O device 504 may include one or more buttons for performing various functions with the vehicle 300, such as locking and unlocking the doors (e.g., activating the door lock 311), unlocking and/or opening the trunk or a lift gate, and/or sounding an alarm.

In the illustrated embodiment, the memory device 203 of the pressure-sensitive seat 200 includes instructions which, when executed by the processor 202, cause the processor 202 to compare the pressure measured or determined by the pressure sensor 201 to a threshold pressure. The threshold pressure may be selected such that inanimate objects which are commonly placed on a vehicle seat, such as a book, do not exceed the threshold pressure. In this manner, the pressure-sensor seat 200 is configured to reduce the incidence of false positives (i.e., reduce the incidence of erroneously sensing an individual is on the pressure-sensitive seat 200 when a light-weight inanimate object is on the pressure-sensitive seat 200). In one or more embodiments, the threshold pressure may be hard-coded in the memory device 203 or the threshold pressure may be selected by a user. In one or more embodiments, the threshold pressure may be in a range from approximately 1 pound (approximately 0.5 kilograms) to approximately 5 pounds (approximately 2.3 kilograms).

Additionally, in one or more embodiments, the memory device 203 of the pressure-sensitive seat 200 includes instructions which, when executed by the processor 202, cause the processor 202 to calculate or determine a proximity (i.e., a distance) of the mobile electronic device 400 to the pressure-sensitive seat 200 (or a proximity of the mobile electronic device 400 to the vehicle 300), and to compare the proximity to a threshold proximity (i.e., a threshold distance between the mobile). The threshold proximity may be selected to correspond to a determination that the user of the mobile electronic device 400 has moved sufficiently far away from the vehicle 300 such that the user is unlikely to immediately return to the vehicle 300. For example, in one or more embodiments, the threshold proximity may be in a range from approximately 5 feet to approximately 50 feet (e.g., approximately 10 feet, approximately 15 feet, approximately 20 feet, or greater). In one or more embodiments, the threshold proximity may be hard-coded in the memory device 203 or the threshold pressure may be selected by a user. In one or more embodiments, the processor 202 of the pressure-sensitive seat 200 may calculate the proximity (i.e., the distance) of the pressure-sensitive seat 200 to the mobile electronic device 400 by receiving a location (e.g., GPS coordinates) of the mobile electronic device 400 from the mobile electronic device 400 and receiving a location (e.g., GPS coordinates) of the pressure-sensitive seat 200, and comparing the location of the mobile electronic device to the location of the pressure-sensitive seat 200 or the vehicle 300. For instance, in one or more embodiments, the instructions stored in the memory device 203 of the pressure-sensitive seat 200, when executed by the processor 202, cause the pressure-sensitive seat 200 to transmit, via the network adapter 206, a request to the mobile electronic device 400 and, in response to the request, the mobile electronic device 400 may acquire the location of the mobile electronic device 400 from the GPS device 405 of the mobile electronic device 400 and then transmit the location data of the mobile electronic device 400, via the network adapter 404, to the pressure-sensitive seat 200. Additionally, in one or more embodiments, the instructions stored in the memory device 203 of the pressure-sensitive seat 200, when executed by the processor 202, cause the pressure-sensitive seat 200 to transmit, via the network adapter 206, a request to the vehicle 300 and, in response to the request, the vehicle 300 may acquire the location of the vehicle 300 from the GPS device 305 of the vehicle 300 and then transmit the location data of the vehicle 300, via the network adapter 303, to the pressure-sensitive seat 200.

Additionally, in one or more embodiments, the memory device 203 of the pressure-sensitive seat 200 includes instructions which, when executed by the processor 202, cause the processor 202 to determine or acquire a state (or status) of the vehicle 300. The state of the vehicle 300 may be whether the vehicle 300 is running or turned off, whether the vehicle 300 is stationary or in motion, whether the doors of the vehicle 300 are locked or unlocked, whether the air conditioning of the vehicle 300 is on or off, and/or whether the windows of the vehicle 300 are fully closed or at least partially open. For instance, in one or more embodiments, the instructions stored in the memory device 203 of the pressure-sensitive seat 200, when executed by the processor 202, cause the pressure-sensitive seat 200 to transmit, via the network adapter 206, a request to the vehicle 300 and, in response to the request, the vehicle 300 may acquire a state of the ignition from the ignition sensor 307 (e.g., whether the vehicle ignition is on or off), a speed of the vehicle 300 from the vehicle speed sensor 306, a state of the windows 312 (i.e., whether the windows are closed or at least partially open), and/or a state of the door locks 311 and then transmit this status information of the vehicle 300, via the network adapter 303, to the pressure-sensitive seat 200. Acquiring the status of the vehicle 300 enables the pressure-sensitive seat 200 to determine the presence of an unattended passenger in the vehicle 300 even if the driver of the vehicle 300 leaves his or her mobile electronic device 400 in the vehicle 300. In one or more embodiments, the pressure-sensitive seat 200 can determine if the vehicle 300 is moving or stationary based on location data acquired by the GPS device 305 of the pressure-sensitive seat 200 (e.g., by comparing the location data received from the GPS device 305 at different times).

In one or more embodiments, the memory device 203 of the pressure-sensitive seat 200 includes instructions which, when executed by the processor 202, cause the pressure-sensitive seat 200 to transmit a command containing executable instructions, via the network adapter 206, to the mobile electronic device 400 and/or the vehicle 300 in response to the proximity between the mobile electronic device 400 and the pressure-sensitive seat 200 (or between the mobile electronic device 400 and the vehicle 300) being greater than the threshold proximity and the pressure detected by the pressure sensor 201 of the pressure-sensitive seat 200 exceeding the pressure threshold. In one or more embodiments, the memory device 203 of the pressure-sensitive seat 200 includes instructions which, when executed by the processor 202, cause the pressure-sensitive seat 200 to transmit a command containing executable instructions, via the network adapter 206, to the mobile electronic device 400 and/or the vehicle 300 in response to the vehicle 300 having a predetermined status (e.g., the ignition being off) and the pressure detected by the pressure sensor 201 of the pressure-sensitive seat 200 exceeding the pressure threshold. In one or more embodiments, the memory device 203 of the pressure-sensitive seat 200 includes instructions which, when executed by the processor 202, cause the pressure-sensitive seat 200 to transmit the command containing executable instructions, via the network adapter 206, to the mobile electronic device 400 and/or the vehicle 300 in response to the pressure detected by the pressure sensor 201 of the pressure-sensitive seat 200 exceeding the pressure threshold and both the vehicle 300 having the predetermined status (e.g., the ignition being off) and the proximity between the mobile electronic device 400 and the pressure-sensitive seat 200 (or between the mobile electronic device 400 and the vehicle 300) being greater than the threshold proximity. Alternatively, in one or more embodiments, the memory device 203 of the pressure-sensitive seat 200 includes instructions which, when executed by the processor 202, cause the pressure-sensitive seat 200 to transmit the command containing executable instructions, via the network adapter 206, to the mobile electronic device 400 and/or the vehicle 300 in response to the pressure detected by the pressure sensor 201 of the pressure-sensitive seat 200 exceeding the pressure threshold and either the vehicle 300 having the predetermined status (e.g., the ignition being off) and the proximity between the mobile electronic device 400 and the pressure-sensitive seat 200 (or between the mobile electronic device 400 and the vehicle 300) being greater than the threshold proximity.

In one or more embodiments, the executable instructions contained in the command transmitted by the pressure-sensitive seat 200, when executed by the processor 401 of the mobile electronic device 400, cause the mobile electronic device 400 to display a visual alert on the display 403 (e.g., a push notification), sound an audible alarm from the speaker 406, and/or actuate the vibration motor 407 to vibrate the mobile electronic device 400. The visual alert may contain a text-based notification stating that a passenger was left unattended in the vehicle 300, and the audible alarm may include a verbal alert that a passenger was left unattended in the vehicle 300. In this manner, an individual who carries his or her mobile electronic device 400 (e.g., mobile phone) and walks sufficiently far away from the vehicle 300 while the pressure-sensitive seat senses a pressure above the threshold pressure will be alerted to the presence of an unattended individual or pet in the vehicle 300.

In one or more embodiments, alert on the mobile electronic device 400 may not be dismissed until the pressure detected by the pressure sensor 201 of the pressure-sensitive seat 200 drops below the threshold pressure, the proximity between the mobile electronic device 400 and the pressure-sensitive seat 200 (or the proximity between the mobile electronic device 400 and the vehicle 300) drops below the threshold proximity, and/or the vehicle 300 has a predetermined status (e.g., the vehicle 300 turns on, the doors unlock, and/or the windows are opened). In one or more embodiments, the alert on the mobile electronic device 400 may be dismissed if the pressure-sensitive seat 200 is a pet mat and the windows of the vehicle 300 are at least partially open.

In one or more embodiments, the executable instructions contained in the command transmitted by the pressure-sensitive seat 200, when executed by the processor 401 of the vehicle 300, cause the controller 304 of the vehicle 300 to sound the horn 310 of the vehicle 300, sound an audible alert (e.g., an alarm or a verbal message) from an alarm system of the vehicle 300, and/or flash the lights 309 of the vehicle 300 (e.g., turn the headlights, the taillights, the turn signal indicator lights, and/or the hazard lights on and off in rapid succession). In this manner, members of the public in the vicinity of the vehicle 300 will be alerted to the presence of an unattended individual or pet in the vehicle 300 (i.e., bystanders will be alerted to the presence of an unattended passenger in the vehicle 300).

Additionally, in one or more embodiments, the executable instructions contained in the command transmitted by the pressure-sensitive seat 200, when executed by the processor of the vehicle 300, cause the controller 304 of the vehicle 300 to at least partially open at least one of the windows 312 of the vehicle 300. Opening at least one of the windows 312 is configured to increase airflow through the cabin of the vehicle 300 and thereby reduce the temperature in the cabin. Otherwise, the temperature in the cabin may rapidly rise to dangerously high levels that can threaten the life or health of the unattended individual or pet in the vehicle 300. Additionally, opening at least one of the windows 312 makes it easier for people in the vicinity of the vehicle 300 to hear the unattended individual or pet in the vehicle 300 (e.g., crying or screaming from a child, or barking from a dog), which increases the likelihood that assistance (e.g., police or medical personnel) will be sought to aid the unattended individual or pet in the vehicle 300.

Additionally, in one or more embodiments, the executable instructions contained in the command transmitted by the pressure-sensitive seat 200, when executed by the processor of the vehicle 300, cause the controller 304 of the vehicle 300 to unlock at least one door lock 311 of the vehicle 300. In one or more embodiments, the executable instructions contained in the command transmitted by the pressure-sensitive seat 200, when executed by the processor 301 of the vehicle 300, cause the controller 304 of the vehicle 300 to unlock all of the door locks 311 of the vehicle 300. In one or more embodiments, the executable instructions contained in the command transmitted by the pressure-sensitive seat 200, when executed by the processor of the vehicle 300, cause the controller 304 of the vehicle 300 to unlock only the door lock 311 of the door that is adjacent to the location of the pressure-sensitive seat 200 (e.g., one of the rear doors of the vehicle 300 that is adjacent to the pressure-sensitive seat 200). In this manner, the pressure-sensitive seat 200 is configured to enable bystanders to rescue the unattended passenger from the vehicle 300.

In one or more embodiments, the memory device 203 of the pressure-sensitive seat 200 includes instructions which, when executed by the processor 202, cause the pressure-sensitive seat 200 to transmit the command containing executable instructions, via the network adapter 206, to the mobile electronic device 400 and/or the vehicle 300 in response to the conditions described above being satisfied for a threshold duration or longer than a time limit (e.g., the pressure detected by the pressure sensor 201 of the pressure-sensitive seat 200 exceeding the pressure threshold and the vehicle 300 having the predetermined status and/or the proximity between the mobile electronic device 400 and the pressure-sensitive seat 200 (or the proximity between the mobile electronic device 400 and the vehicle 300) being greater than the threshold proximity for at least the threshold duration). Accordingly, in one or more embodiments, the pressure-sensitive seat 200 is configured not to send an alert to the mobile electronic device 400 or the vehicle 300 if the individual returns to vehicle 300 within a preset time limit to attend to the temporarily unattended passenger. In one or more embodiments, the threshold duration may be in a range from approximately 10 second to approximately 30 seconds. In one or more embodiments, the threshold duration may be hard-coded in the memory device 203 or the threshold pressure may be selected by a user.

In one or more embodiments, the memory device 203 of the pressure-sensitive seat 200 includes instructions which, when executed by the processor 202, cause the pressure-sensitive seat 200 to emit an alarm or other audible alert if electronic devices within range of the network adapter 206 of the pressure-sensitive seat 200 are not paired to the pressure-sensitive seat 200 and the pressure detected by the pressure sensor 201 of the pressure-sensitive seat 200 exceeds the pressure threshold. In this manner, the pressure-sensitive seat 200 is configured to prevent or at least mitigate against individuals trying to thwart the protections of the pressure-sensitive seat 200 by not pairing the pressure-sensitive seat 200 to the vehicle 300 or to the mobile electronic device 400 operated by the driver of the vehicle 300.

FIG. 2 is a flowchart illustrating tasks of a method 700 of monitoring for unattended passengers (e.g., an individual or a pet) in a vehicle. In the illustrated embodiment, the method 700 includes a task 710 of acquiring a pressure of an individual (e.g., a child or a pet) on a pressure-sensitive seat in the vehicle. As described above, the pressure-sensitive seat may be integrated into a car seat or a seat protector mat for a pet. The method 700 also includes a task 720 of comparing the pressure acquired in task 710 against a threshold pressure. The threshold pressure may be selected to reduce the incidence of false positives (i.e., reduce the incidence of erroneously sensing an individual is on the pressure-sensitive seat when a light-weight inanimate object, such as a book, is on the pressure-sensitive seat). In one or more embodiments, the threshold pressure may be in a range from approximately 1 pound (approximately 0.5 kilograms) to approximately 5 pounds (approximately 2.3 kilograms).

In the illustrated embodiment, the method 700 includes a task 730 of determining or acquiring a proximity (i.e., a distance) between the pressure-sensitive seat and a mobile electronic device used by an operator of the vehicle (or a proximity between the mobile electronic device and the vehicle in which the pressure-sensitive seat is located). In one or more embodiments, the mobile electronic device may be synced or paired to the vehicle and/or the pressure-sensitive seat in the seat. The method also includes a task 740 of comparing the proximity acquired or determined in task 730 against a threshold proximity. The threshold proximity may be selected to reduce the incidence of falsely determining that the user of the mobile electronic device has left the vehicle. For example, in one or more embodiments, the threshold proximity may be approximately 5 feet or greater (e.g., approximately 10 feet, approximately 15 feet, approximately 20 feet, or greater).

In the illustrated embodiment, the method 700 also includes a task 750 of acquiring or determining a state or status of one or more components of the vehicle. For example, in one or more embodiments, the state or status information may include whether the vehicle is running or turned off, whether the vehicle is stationary or in motion, whether the doors of the vehicle are locked or unlocked, whether the air conditioning of the vehicle is on or off, and/or whether the windows of the vehicle are fully closed or at least partially open. In the illustrated embodiment, the method 700 also includes a task 760 of determining whether the status information of the vehicle matches at least of preselected parameter of the vehicle. In one or more embodiments, the preselected parameter may include that the vehicle is turned off.

In one or more embodiments, the method 700 may include the task 730 of determining or acquiring a proximity (i.e., a distance) between the pressure-sensitive seat and the mobile electronic device (or a proximity between the mobile electronic device and the vehicle) and the task 740 of comparing the proximity against a threshold proximity, but not include the task 750 of acquiring or determining a state or status of one or more components of the vehicle or the task 760 of determining whether the status information of the vehicle matches at least of preselected parameter of the vehicle. In one or more embodiments, the method 700 may include the task 750 of acquiring or determining a state or status of one or more components of the vehicle and the task 760 of determining whether the status information of the vehicle matches at least of preselected parameter of the vehicle, but not include the task 730 of determining or acquiring a proximity (i.e., a distance) between the pressure-sensitive seat and the mobile electronic device (or a proximity between the mobile electronic device and the vehicle) or the task 740 of comparing the proximity against a threshold proximity.

In one or more embodiments, the method 700 also includes a task 770 of determining whether the duration that the pressure acquired in task 710 exceeds the pressure threshold (as determined in task 720) and that the proximity of the mobile electronic device to the pressure-sensitive seat (or the proximity of the mobile electronic device to the vehicle) acquired in task 730 exceeds the threshold proximity (as determined in task 740) exceeds a threshold duration (i.e., a time limit). In one or more embodiments, the task 770 includes determining whether the duration that the pressure acquired in task 710 exceeds the pressure threshold (as determined in task 720) and that the proximity of the mobile electronic device to the pressure-sensitive seat (or the proximity of the mobile electronic device to the vehicle) acquired in task 730 exceeds the threshold proximity (as determined in task 740), and that the status of the vehicle acquired in task 750 has a predetermined status (as determined in task 760) exceeds the threshold duration (i.e., a time limit). In one or more embodiments, the task 770 includes determining whether the duration that the pressure acquired in task 710 exceeds the pressure threshold (as determined in task 720) and that the status of the vehicle acquired in task 750 has a predetermined status (as determined in task 760) exceeds the threshold duration (i.e., a time limit).

In the illustrated embodiment, the method 700 also includes a task 780 of sending a command, from the pressure-sensitive seat, containing executable instructions to the mobile electronic device and/or to the vehicle in response to the pressure acquired in task 710 exceeding the pressure threshold (as determined in task 720) and at least one of the proximity of the mobile electronic device to the pressure-sensitive seat or the vehicle acquired in task 730 exceeding the threshold proximity (as determined in task 740) or the status of the vehicle acquired in task 750 having a predetermined status (as determined in task 760). The executable instructions of the command, when executed by mobile electronic device, may cause the mobile electronic device to display a visual alert on a display of the mobile electronic device (e.g., a push notification), sound an audible alarm and/or verbal alert from a speaker of the mobile electronic device, and/or actuate a vibration motor to vibrate the mobile electronic device. The executable instructions of the command, when executed by vehicle, may cause the vehicle to sound a horn of the vehicle, flash one or more lights of the vehicle (e.g., turn the headlights, the taillights, turn signal indicator lights, and/or the hazard lights on and off in rapid succession), at least partially open at least one window of the vehicle, and/or unlock at least one of the doors of the vehicle. In this manner, the method 700 is configured to prompt and enable the driver and/or bystanders to rescue passengers who have been left unattended in the vehicle.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described systems and methods of operation can be practiced without meaningfully departing from the principles, spirit, and scope of this invention, as set forth in the following claims, and equivalents thereof.

What is claimed is:

1. A pressure-sensitive seat configured to be installed in a vehicle, the pressure-sensitive seat comprising:
   at least one pressure sensor configured to measure a pressure on the pressure-sensitive seat;
   a processor;
   a memory device;
   a network adapter; and
   a system bus configured to enable communication between the at least one pressure sensor, the processor, the memory device, and the network adapter,
   wherein the memory device includes instructions which, when executed by the processor, cause the processor to:
   compare the pressure to a threshold pressure;
   determine a proximity of a mobile phone to the pressure-sensitive seat or the vehicle;
   determine if any mobile electronic devices, including the vehicle, in a range of the network adapter are paired to the pressure-sensitive seat;
   transmit, by the network adapter, a command comprising executable instructions to the mobile phone in response to the pressure on the pressure-sensitive seat exceeding the threshold pressure and the proximity exceeding a threshold proximity; and
   emit, by a speaker of the pressure-sensitive seat, an audible alert in response to the pressure on the pressure-sensitive seat exceeding the threshold pressure and none of the mobile electronic devices in the range of the network adapter being paired to the pressure sensitive seat,
   wherein the executable instructions, when executed by the mobile phone, cause the mobile phone to generate an alert that cannot be dismissed until the detected pressure drops below the threshold pressure or the proximity drops below the threshold proximity.

2. The pressure-sensitive seat of claim 1, wherein the threshold pressure is in a range from approximately 1 pound to approximately 5 pounds.

3. The pressure-sensitive seat of claim 1, wherein the threshold proximity is in a range from approximately 5 feet to approximately 50 feet.

4. The pressure-sensitive seat of claim 1, wherein the instructions, when executed by the processor, cause the processor to transmit the command in response to the pressure exceeding the threshold pressure and the proximity exceeding the threshold proximity for a threshold duration.

5. The pressure-sensitive seat of claim 4, wherein the threshold duration is in a range from approximately 10 seconds to approximately 30 seconds.

6. The pressure-sensitive seat of claim 1, wherein the instructions, when executed by the processor, further cause the processor to:
   acquire a status of the vehicle in which the pressure-sensitive seat is located; and
   transmit the command in response to the pressure exceeding the threshold pressure, the proximity exceeding the threshold proximity, and the status indicating the vehicle is turned off.

7. The pressure-sensitive seat of claim 1, wherein the pressure-sensitive seat is a child car seat.

8. The pressure-sensitive seat of claim 1, wherein the pressure-sensitive seat is a protective seat mat for an animal.

9. The pressure-sensitive seat of claim 1, wherein the at least one pressure sensor is selected from the group consisting of a capacitive pressure sensor, a piezoelectric pressure sensor, a strain gauge pressure sensor, and a variable reluctance pressure sensor.

10. The pressure-sensitive seat of claim 1, wherein the instructions, when executed by the processor, cause the processor to transmit the command to the mobile phone, and wherein the executable instructions, when executed by a processor of the mobile phone, cause the mobile phone to display, on a display of the mobile phone, a visual alert.

11. The pressure-sensitive seat of claim 1, wherein the instructions, when executed by the processor, cause the processor to transmit the command to the mobile phone, and wherein the executable instructions, when executed by a processor of the mobile phone, cause the mobile phone to emit, from a speaker of the mobile phone, an audible alert.

12. The pressure-sensitive seat of claim 1, wherein the instructions, when executed by the processor, cause the processor to transmit the command to the mobile phone, and wherein the executable instructions, when executed by a processor of the mobile phone, cause the mobile phone to vibrate.

13. The pressure-sensitive seat of claim 1, wherein the instructions, when executed by the processor, cause the processor to transmit the command to the vehicle, and wherein the executable instructions, when executed by a processor of the vehicle, cause the vehicle to sound a horn of the vehicle.

14. The pressure-sensitive seat of claim 1, wherein the instructions, when executed by the processor, cause the processor to transmit the command to the vehicle, and wherein the executable instructions, when executed by a processor of the vehicle, cause the vehicle to flash at least one light of the vehicle.

15. The pressure-sensitive seat of claim 1, wherein the instructions, when executed by the processor, cause the processor to transmit the command to the vehicle, and wherein the executable instructions, when executed by a processor of the vehicle, cause the vehicle to at least partially open at least one window of the vehicle.

16. The pressure-sensitive seat of claim 1, wherein the instructions, when executed by the processor, cause the processor to transmit the command to the vehicle, and wherein the executable instructions, when executed by a processor of the vehicle, cause the vehicle to unlock at least one door of the vehicle.

17. A method of monitoring for an unattended passenger in a vehicle, the method comprising:
    determining, with a pressure sensor of a pressure-sensitive seat in the vehicle, a detected pressure on the pressure-sensitive seat;
    comparing, with a processor, the detected pressure with a threshold pressure;
    acquiring at least one of a status of the vehicle and a proximity of a mobile phone to the vehicle or the pressure-sensitive seat;
    determining if any mobile electronic devices, including the vehicle, in a range of the network adapter are paired to the pressure-sensitive seat;
    transmitting a command comprising executable instructions, from a network adapter of the pressure-sensitive seat, to the mobile phone in response to the detected pressure exceeding the threshold pressure and at least one of the proximity exceeding a threshold proximity and the status of the vehicle being a predetermined status; and
    emitting, by a speaker of the pressure-sensitive seat, an audible alert in response to the pressure on the pressure-sensitive seat exceeding the threshold pressure and none of the mobile electronic devices in the range of the network adapter being paired to the pressure sensitive seat,
    wherein the executable instructions, when executed by the mobile phone, cause the mobile phone to generate an alert that cannot be dismissed until the detected pressure drops below the threshold pressure or the proximity drops below the threshold proximity.

18. The method of claim 17, further comprising at least partially opening at least one window of the vehicle in response to the command.

19. The method of claim 17, further comprising unlocking at least one door of the vehicle in response to the command.

20. The method of claim 17, further comprising at least one of honking a horn of the vehicle and flashing at least one light of the vehicle in response to the command.

21. The method of claim 17, further comprising at least one of displaying a visual alert on a display of the mobile phone, sounding an audible alert from a speaker of the mobile phone, and vibrating the mobile phone in response to the command.

22. A pressure-sensitive seat configured to be installed in a vehicle, the pressure-sensitive seat comprising:
    at least one pressure sensor configured to measure a pressure on the pressure-sensitive seat;
    a processor;
    a memory device;
    a network adapter; and
    a system bus configured to enable communication between the at least one pressure sensor, the processor, the memory device, and the network adapter,
    wherein the memory device includes instructions which, when executed by the processor, cause the processor to:
    compare the pressure to a threshold pressure;
    determine if any mobile electronic devices, including the vehicle, in a range of the network adapter are paired to the pressure-sensitive seat; and
    emit, by a speaker of the pressure-sensitive seat, an audible alert in response to the pressure on the pressure-sensitive seat exceeding the threshold pressure and none of the mobile electronic devices in the range of the network adapter being paired to the pressure sensitive seat.

* * * * *